March 5, 1963 S. F. THUNBERG 3,080,496

BRUSH HOLDER

Filed Dec. 21, 1959

INVENTOR.
Sigurd Ferdinand Thunberg
BY
Edmund␣␣␣␣␣␣
his ATTORNEY

United States Patent Office 3,080,496
Patented Mar. 5, 1963

3,080,496
BRUSH HOLDER
Sigurd Ferdinand Thunberg, Stockholm, Sweden, assignor to Aktiebolaget Electrolux, Stockholm, Sweden, a corporation of Sweden
Filed Dec. 21, 1959, Ser. No. 860,866
Claims priority, application Sweden Dec. 22, 1958
14 Claims. (Cl. 310—247)

This invention relates to electrical apparatus of the type employing commutator arrangements.

During the operation of rotary electrical devices employing commutators, electrical disturbance or noise signals are almost always generated. These noise signals cause interference with radio and television reception and the like and are therefore undesirable. To abate the strength of such noise signals, it is customary to employ inductance chokes or coils arranged in electrical series with the commutators. For example, it is conventional to connect chokes in series with the commutators of electric motors in order to reduce the noise signals generated thereby. It is also known that coils connected between carbon brushes and the associated field windings will reduce electrical disturbances.

The use of chokes or coils is, however, disadvantageous from a production viewpoint and particularly so in association with small motors and the like. The disadvantages arise principally from the fact that in electrical devices of small size, all available space is generally efficiently and completely utilized so that chokes or coils cannot be conveniently accommodated.

It is an object of the invention to provide an improved arrangement for preventing the generation of noise signals and electrical disturbances in rotary electrical equipment.

It is a further object of the invention to provide for avoiding the generation of noise signals in rotary electrical devices in a simple and space-consuming manner so as to avoid the disadvantages noted above.

In conventional rotary electrical devices employing commutators, it is customary to make electrical connection with these commutators by the use of carbon brushes or the like. Furthermore, it is customary to urge these brushes against the associated commutators by the use of springs. To achieve its purpose of abating noise signals while conserving space requirements, the invention contemplates operatively associating, with the aforesaid springs, means enabling these springs to operate as inductance chokes or coils which attenuate the noise signals in the manner customarily provided for by the addition of independent chokes or coils.

Preferably, the invention contemplates associating with the above-mentioned springs cores or like bodies of a material having a magnetic permeability of greater than one. These bodies have the effect of increasing the inductive reactance of the associated springs which thereby constitute high impedance members.

Other objects, as well as features of the invention, will be found in the following detailed description of some preferred embodiments as illustrated in the accompanying drawing in which.

Figure 1:
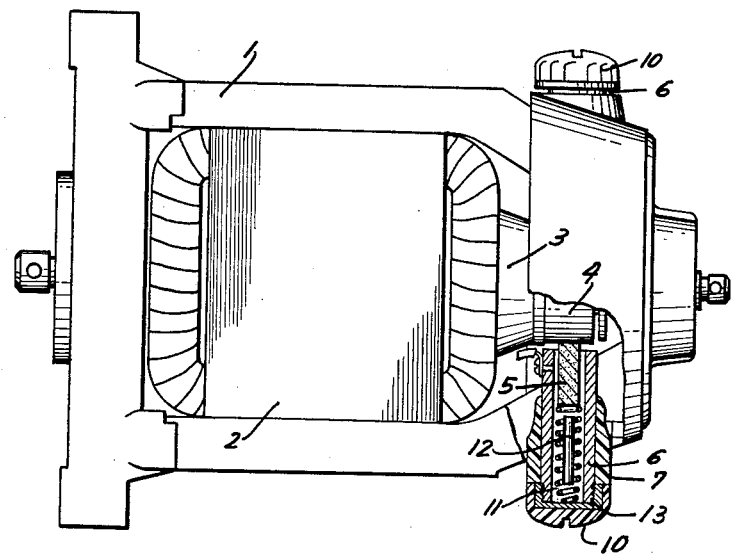
FIG. 1 is a diagrammatic view of an electric motor provided with a commutator and including the improvement of the invention.

The motor shown in FIG. 1 includes generally a housing 1 surrounding a stator 2 and a rotor 3. The rotor 3 is provided in known manner with a commutator 4. Carbon brushes, of which only the carbon brush 5 is shown in the drawing, rest against the commutator 4 and provide electrical connection therewith.

Each carbon brush is housed in a sleeve 6 which may be of metal or of an insulating material, as will hereinafter be indicated in greater detail. It is preferred that the brush 5 not make direct contact with the sleeve 6 and a suitable insulation can be provided between these members if found necessary.

Sleeve 6 is mounted on the housing 1 by a bushing or bracket 7 of insulating material. Bracket 7 can be fabricated of metal in the event that the sleeve 6 is made of insulating material.

Figure 2:
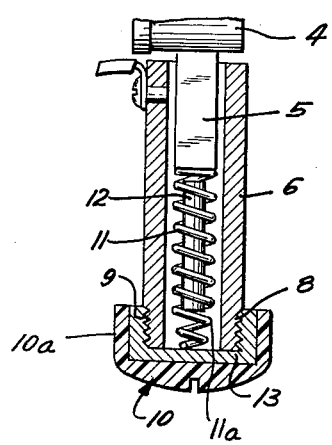
FIG. 2 illustrates the improved portion of the structure of FIG. 1 on enlarged scale and partially in section.

As best illustrated in FIG. 2, the sleeve 6 is provided with a thread 8 at the end of said sleeve which is remotely from the commutator 4. A thread 9 provided internally of a cover or cap 10 engages the thread 8 so that the cover 10 closes the sleeve and forms a seat for a coil or helical spring 11 which urges the brush 5 against the commutator 4.

The cover 10 includes an external section 10a of insulating material and is provided with a metal insert 13 in which the thread 9 is formed. The insert 13 provides an electrical connection between the metal sleeve 6 and one end of the spring 11, the other end of which provides electrical connection with the brush 5.

As illustrated in FIG. 2, a core 12 is inserted within the helix of spring 11. The core 12 is of a material having a magnetic permeability of greater than one. A preferred material is a ferro-magnetic material like pressed ferrite powder, although other known materials can be employed. The core 12 functions as a means which is operatively disposed with respect to the spring 11 to increase the inductive reactance thereof so that the spring effectively operates as a choke. Thus, springs such as the spring 11 are adapted to replace conventionally employed chokes and coils as were heretofore used in accordance with the prior art.

The core 12 is of a diameter which is less than the inner diameter of spring 11. The core therefore does not prevent the spring from urging the brush 5 against the commutator 4. Core 12, preferably, is of a length which is less than the length of the spring 11 in its compressed condition so as not to interfere with the complete and efficient operation of the spring. Moreover, spring 11 may be provided with one or more turns 11a having an inner diameter which is less than the diameter of the core 12 so as to restrict relative movement between the core and spring and thereby lock the core in the spring.

Figure 3:
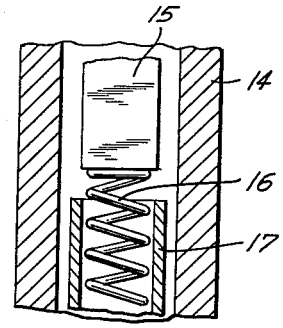
FIG. 3 illustrates in section, a modification of the structure illustrated in FIG. 2.

FIG. 3 illustrates a modification of the structure of FIG. 2 and shows an insulating sleeve 14 accommodating a brush 15 which is urged towards an associated commutator by means of a spring 16. In this embodiment of the invention, the means for enabling the spring to operate as a high impedance choke is constituted by a cylindrical body 17 of a material having a permeability greater than one. Body 17 encircles the spring 16 and replaces the internal core previously described. Sleeve 14 may be penetrated by or otherwise provided with an electrical connection by means of which contact is made with the spring 16.

By the arrangements described above, there is obtained a surprisingly good elimination of noise signals and electrical disturbances. There is, moreover, achieved in accordance with the invention, a simplified mounting arrangement whereby space-consuming chokes or coils are avoided.

It is to be noted that the invention finds application not only in electric motors, but as well in association with generators and other like rotary electrical devices. In some instances it is also possible to employ the invention in association with flat springs having a sliding contact with the associated commutators.

Modifications and variations of the above structures are possible within the scope of the invention as defined by the following claims.

I claim:

1. In an electrical device including a commutator; apparatus for establishing electrical connection with said commutator comprising a brush and a spring operatively disposed with respect to said brush for urging the same against said commutator, said spring being of an electrically conductive material and constituting an inductance choke, and means operatively disposed with respect to said spring to increase the inductive reactance of the choke, said last-mentioned means comprising a body of material having a magnetic permeability of greater than one.

2. Apparatus as claimed in claim 1, wherein said spring is a helical spring and said body of material forms at least a part of a core positioned within the spring.

3. Apparatus as claimed in claim 1, wherein said body of material encircles said spring.

4. Apparatus as claimed in claim 1, wherein said body of material is disposed exteriorly of said spring and at its immediate vicinity.

5. Apparatus as claimed in claim 1, wherein said body comprises ferro-magnetic material.

6. Apparatus as claimed in claim 1, wherein said spring is a helical spring and said body of material extends axially along said spring; said spring having a length when compressed which is at least equal to the length of said body.

7. Apparatus as claimed in claim 1 comprising a sleeve housing said spring which is of helical shape and a cap covering said sleeve and providing a support for said spring, said cap including an electrically conductive section engaging said spring and providing for electrical connection thereto.

8. Apparatus as claimed in claim 7, wherein at least the inner wall surface of said sleeve is formed of insulating material.

9. Apparatus as claimed in claim 7, wherein said sleeve and cap are threadably engaged.

10. In an electrical device having a commutator, apparatus for establishing electrical connection with said commutator comprising a brush, means including a spring having the shape of a helix operatively disposed with respect to said brush for urging the same against said commutator, said spring being of an electrically conductive material and constituting an inductance choke, and means comprising a cylindrical core accommodated within the helix to increase the inductive reactance of the choke, said spring including a plurality of turns one of which has an inner diameter smaller than the diameter of the core to limit relative movement between the core and spring.

11. In rotatable electrical apparatus having a commutator and an electrical connection therewith including a brush, resilient means forming a part of said electrical connection for urging said brush in contact with said commutator, said resilient means including a spring member, and means comprising a body of material having a permeability of greater than one which is positioned at the immediate vicinity of said spring member and adapted to be magnetized by current in said electrical connection.

12. Electrical apparatus as set forth in claim 11 in which said body includes ferro-magnetic material.

13. Electrical apparatus as set forth in claim 12 in which said spring member includes a compressible coil section, the body of material being disposed within the coil section of said spring member.

14. Electrical apparatus as set forth in claim 12 in which said spring member includes a compressible coil section, the body of material being disposed exteriorly of the coil section of said spring member.

References Cited in the file of this patent

UNITED STATES PATENTS

| | | |
|---|---|---|
| 1,488,574 | Wagner | Apr. 1, 1924 |
| 2,615,939 | Mitchell | Oct. 28, 1952 |

FOREIGN PATENTS

| | | |
|---|---|---|
| 355,274 | Great Britain | Aug. 19, 1931 |